US008528002B2

(12) United States Patent
Willoughby

(10) Patent No.: US 8,528,002 B2
(45) Date of Patent: Sep. 3, 2013

(54) PROVIDING ACCESS CONTROL FOR A DESTINATION IN A MESSAGING SYSTEM

(75) Inventor: Philip G Willoughby, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/728,537

(22) Filed: Mar. 22, 2010

(65) Prior Publication Data

US 2010/0287564 A1 Nov. 11, 2010

(30) Foreign Application Priority Data

May 11, 2009 (EP) .................................... 09159839

(51) Int. Cl.
*G06F 3/00* (2006.01)
(52) U.S. Cl.
USPC .......................................... 719/310; 719/312
(58) Field of Classification Search
USPC .......................................... 719/314, 310, 312
See application file for complete search history.

(56) References Cited

U.S. PATENT DOCUMENTS

| 5,212,792 | A  | * | 5/1993  | Gerety et al. ................ | 717/100 |
| 6,317,794 | B1 | * | 11/2001 | Papierniak et al. ........... | 709/229 |
| 6,438,612 | B1 | * | 8/2002  | Ylonen et al. ................ | 709/249 |
| 6,978,417 | B1 | * | 12/2005 | Kohn et al. ................... | 715/202 |
| 7,127,507 | B1 |   | 10/2006 | Clark et al. |  |
| 7,636,769 | B2 | * | 12/2009 | Volodarsky et al. .......... | 709/219 |
| 2005/0289095 | A1 | * | 12/2005 | Rauhala et al. ................ | 707/1 |
| 2006/0195455 | A1 | * | 8/2006  | Shah et al. .................... | 707/100 |
| 2006/0218560 | A1 |   | 9/2006  | Daviomov et al. |  |
| 2007/0005800 | A1 | * | 1/2007  | Banks et al. .................. | 709/238 |
| 2008/0040396 | A1 |   | 2/2008  | Wallis et al. |  |

OTHER PUBLICATIONS

Chi-Chun Pan, Semantic Access Control for Information Interoperation, Jun. 7, 2006.*
"Working with alias queues", middleware.its.state.nc.us/middleware/Documentation/en_US/htm/anqzag03/amqzag031c.htm, 2002.
"Configuring a JMS activation specification for MDBs used by the default messaging provider", publib.boulder.ibm.com/infocenter/wasinfo/v6r0/index.jsp?topic-/com.ibm.websphere.pmc.express.doc/tasks/tjn0025_.html, 2008.

* cited by examiner

*Primary Examiner* — Lechi Truong
(74) *Attorney, Agent, or Firm* — North Shore Patents, P.C.; Michele Liu Baillie

(57) ABSTRACT

Providing controlled access for a destination in a messaging system includes: selecting a destination for storing messages in a messaging system, one or more of the messages comprising one or more message properties; associating each of a set of message requestors with a set of message selectors; and in response to an access request for the destination from a message requestor, determining the set of said message selectors associated with the message requestor and using the identified set of message selectors to check against messages on the destination comprising a corresponding set of message properties for providing a response to the access request.

10 Claims, 4 Drawing Sheets

PROVIDING ACCESS CONTROL FOR A DESTINATION IN A MESSAGING SYSTEM

CROSS-REFERENCE TO RELATED APPLICATIONS

The present application claims priority to European Patent Application No. 09159839.1, filed on May 11, 2009.

BACKGROUND

1. Field of Invention

The present invention relates to a method and computer program product for providing access control for a destination in a messaging system.

2. Background of the Invention

Many computer systems comprise software systems that intercommunicate using messaging. Such messaging is managed by a messaging application program. Messages are communicated asynchronously between processes via message destinations, such as queues. Processes store or put messages on queues and also retrieve or get messages from queues. Queues commonly have a defined function, that is, a given queue is used for communicating between a specific set of processes or for communicating messages of a particular type. Where access to a given communication needs to be controlled, a specific queue may be provided. The communicating parties commonly manage such access control. However, one problem with these arrangements is that the access control is easily circumvented.

BRIEF SUMMARY

According to a first aspect there is provided, a method for providing controlled access for a destination in a messaging system, the method comprising: selecting a destination for storing messages in a messaging system, one or more of the messages comprising one or more message properties; associating each of a set of message requestors with a set of message selectors; and in response to an access request for the destination from a message requestor, determining the set of the message selectors associated with the message requestor and using the identified set of message selectors to check against messages on the destination comprising a corresponding set of message properties for providing a response to the access request.

A computer program product corresponding to the above summarized method is also described and claimed herein.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
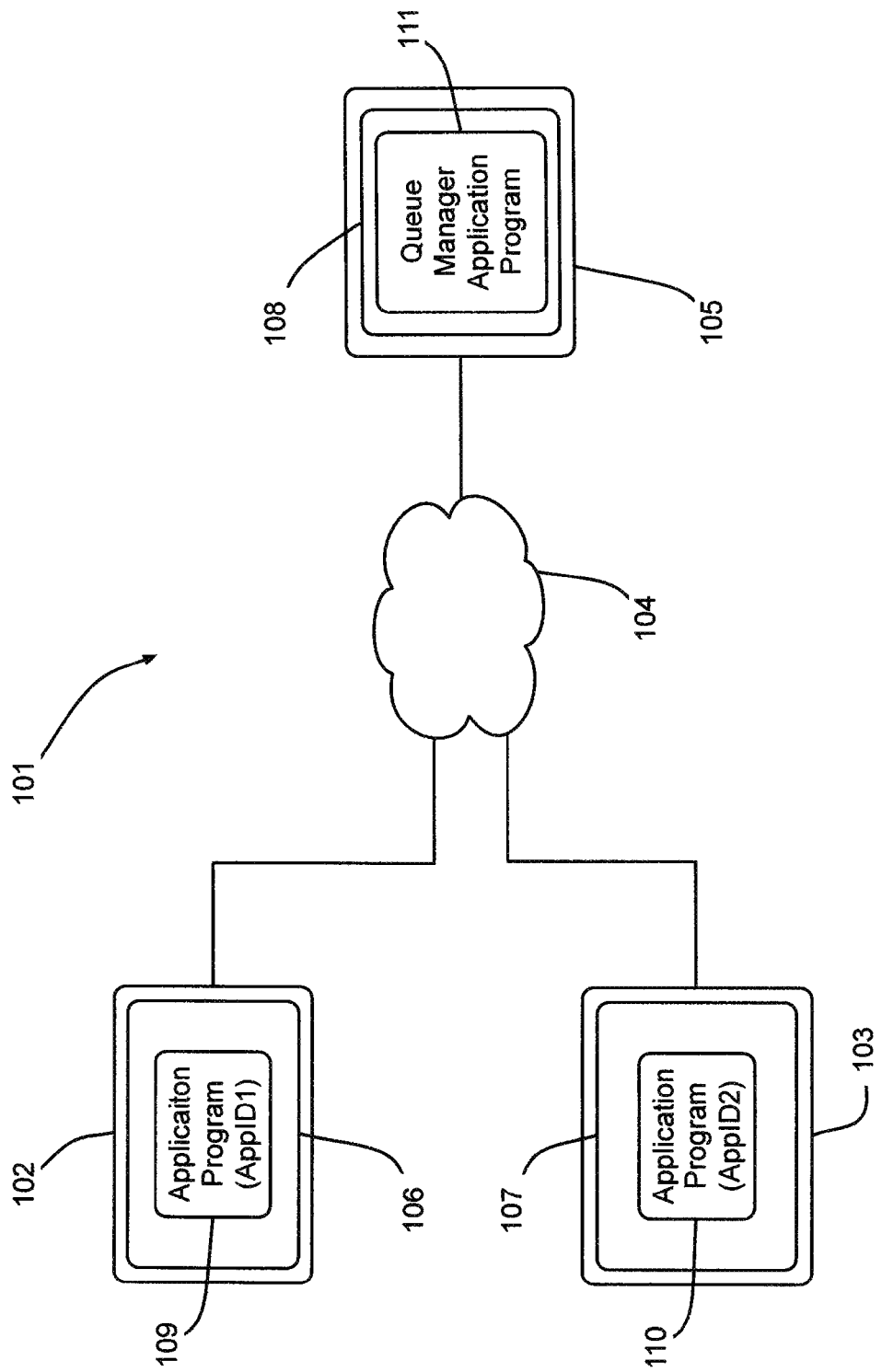
FIG. 1 is a schematic illustration of a computer system comprising a messaging system.

With reference to FIG. 1, a computer system 101 comprises a first and second computers 102, 103 connected using a network 104 to a third computer 105. Each of the computers 102, 103, 105 is loaded with a respective operating system 106, 107, 108 which provide respective platforms for application programs. In the present embodiment, first and second data processing application programs 109, 110 are provided respectively on the first and second computers 102, 103. The application programs 109, 110 intercommunicate using a messaging system provided by a message-orientated middleware (MOM) application program, in the form of a queue manager application program 111, provided on the third computer. Each of the application programs 109, 110 are provided with application program interfaces (API) that enable the logic of the application programs 109, 110 to interact, via the queue manager application 111, by sending and receiving messages.

Figure 2:
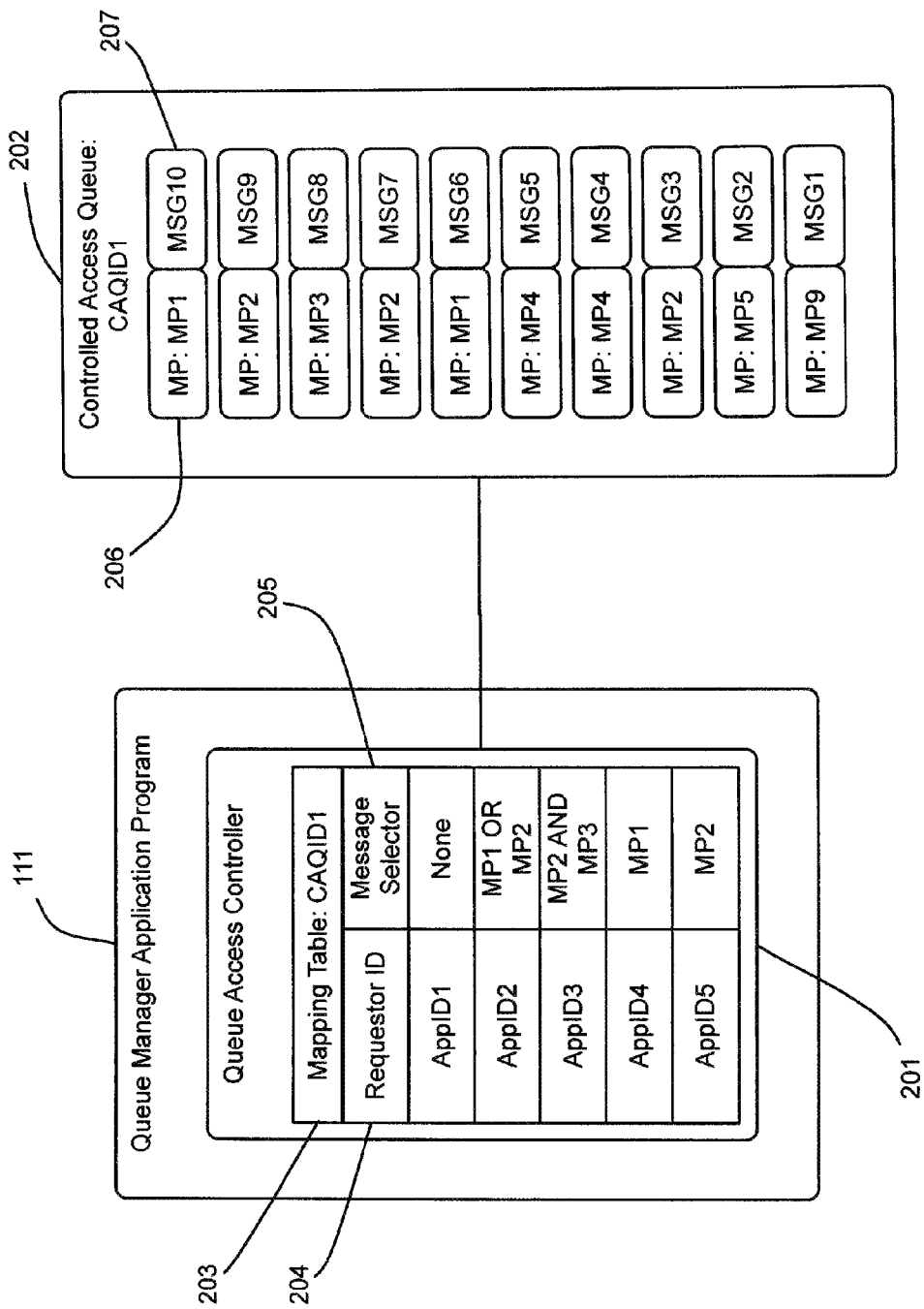
FIG. 2 is a schematic illustration of elements of a message queue manager application program in the messaging system of FIG. 1.

With reference to FIG. 2, the queue manager application program 111 is arranged to manage a set of destinations, in the form of queues, for storing messages that provide the communications between the application programs 109, 110. In the present embodiment, the queue manager module 111 further comprises a queue access controller (QAC) module 201 arranged to provide controlled access to a specialized queue 202, in the form of a controlled access queue (CAQ). The QAC 201 comprises a mapping table 203 that provides access control data in the form of requestor identifier (ID) 204 and message selector 205 pairs. Each requestor ID 204 uniquely identifies a requestor, that is, one of the application programs 109, 110. Each message selector 205 uniquely identifies predetermined access to messages on the CAQ 202 that has been assigned to the corresponding requestor ID 204. The message selectors 205 are arranged to correspond to message properties 206 of messages 207 stored on the CAQ 202. In this manner, the message selectors 205 define the set of messages stored on the CAQ 202 that a requestor having the corresponding requestor ID 204 may access.

In the present embodiment, an administrator determines the predetermined access to messages on the CAQ 202 by setting one or more message selectors 205 for a given requestor. The message selectors 205 are set to values that correspond to the values of message properties 206 of messages 207 that a given requestor is permitted to access on the CAQ 202. The actual message properties 206 of messages 207 placed on the CAQ 202 are determined by the application programs 109, 110 and are thus likely to be out of the control of the administrator. Nevertheless, by controlling the message selectors 205, the administrator is able to control the messages that can be accessed by a given requestor. For example, a requestor may be prevented from accessing messages that the requestor would not understand or that comprise data or information to which the requestor should not have access. In other words, access would only be permitted, by the selection of the appropriate message selectors 205, to messages that a given requestor is capable of understanding or that comprise data that the requestor is allowed to obtain.

As shown in FIG. 2, some requestors, such as the first application (AppID1) 109, have no restrictions on the messages that can be accessed. Other requestors, such as the second application (ApplID2) have access to only those messages 207 having one of a set of message properties (MP1 OR MP2). Some requestors, such as the third application (ApplID3) have access to only those messages 207 having all of a set of message properties (MP2 AND MP3). Other requestors such as a fourth application (AppID4) can only access messages 207 that have single message property (MP1). As will be understood by those skilled in the art, a single message 207 may comprise a set of message properties 206 that may, in turn, correspond to a set of message selectors 205.

When a given requestor attempts to browse or get messages from the CAQ 202, the corresponding set of access control message selectors 205 is added to the request so as to restrict the request to only those messages having a corresponding set of message properties 206. If an incoming request comprises one or more existing message selectors, the set of access control message selectors 205 is added to the existing message selectors with a logical AND. Therefore, in the present embodiment, a given requestor can get or browse only those messages 207 on the CAQ 202 to which access is permitted by the corresponding message selectors 205 in the mapping table 203.

Figure 3:
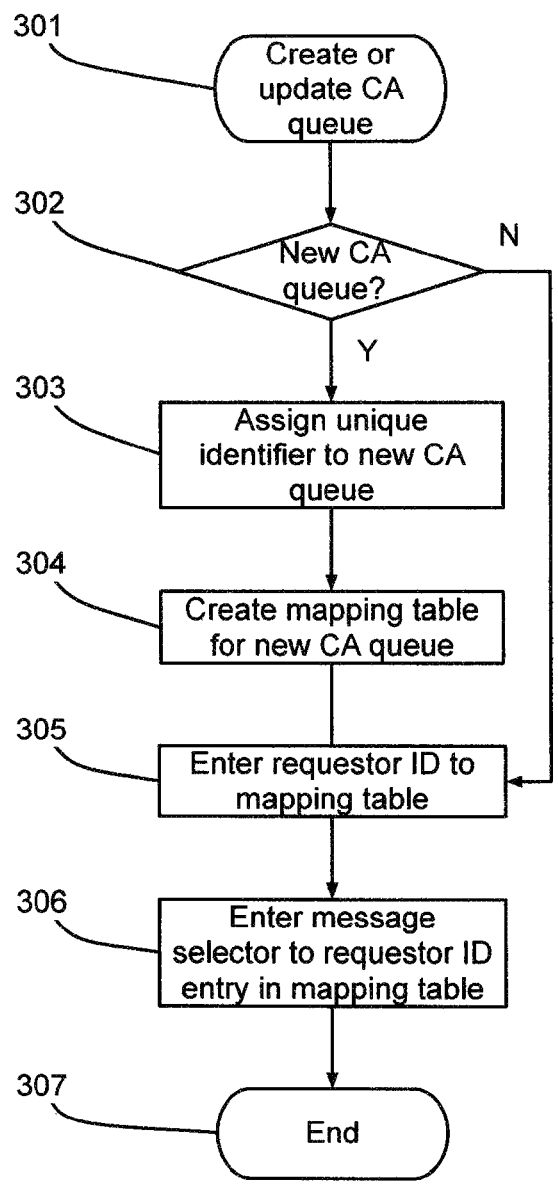
FIG. 3 is a flow chart illustrating the processing performed by the queue manager application program of FIG. 2 when creating a controlled access queue.

The processing performed by the QAC 201 when creating a new controlled access facility for a given requestor and CAQ 202 will now be described further with reference to the flow chart of FIG. 3. Processing is initiated at step 301 in response to the receipt by the QAC 201 of a request for a new controlled access facility for a given requestor to a given queue and processing then moves to step 302. At step 302, the QAC 201 determines whether the given queue currently has a controlled access facility. If the given queue has an existing controlled access facility indicated by a corresponding mapping table 203 then processing moves to step 305 and proceeds as described below. If the given queue does not have a controlled access facility then processing moves to step 303. At step 303, a unique CAQ identifier (QACID) is assigned to the given queue and processing moves to step 304. At step 304, a new mapping table 203 is created for the new CAQ 202 and processing moves to step 305. At step 305, the new requestor identifier (Requestor ID) is added to the mapping table 203 and processing moves to step 306. At step 306, the permitted access for new requestor is determined by an administrator and added as a set of message selectors 205 in the mapping table 203. Processing then moves to step 307 and ends.

Figure 4:
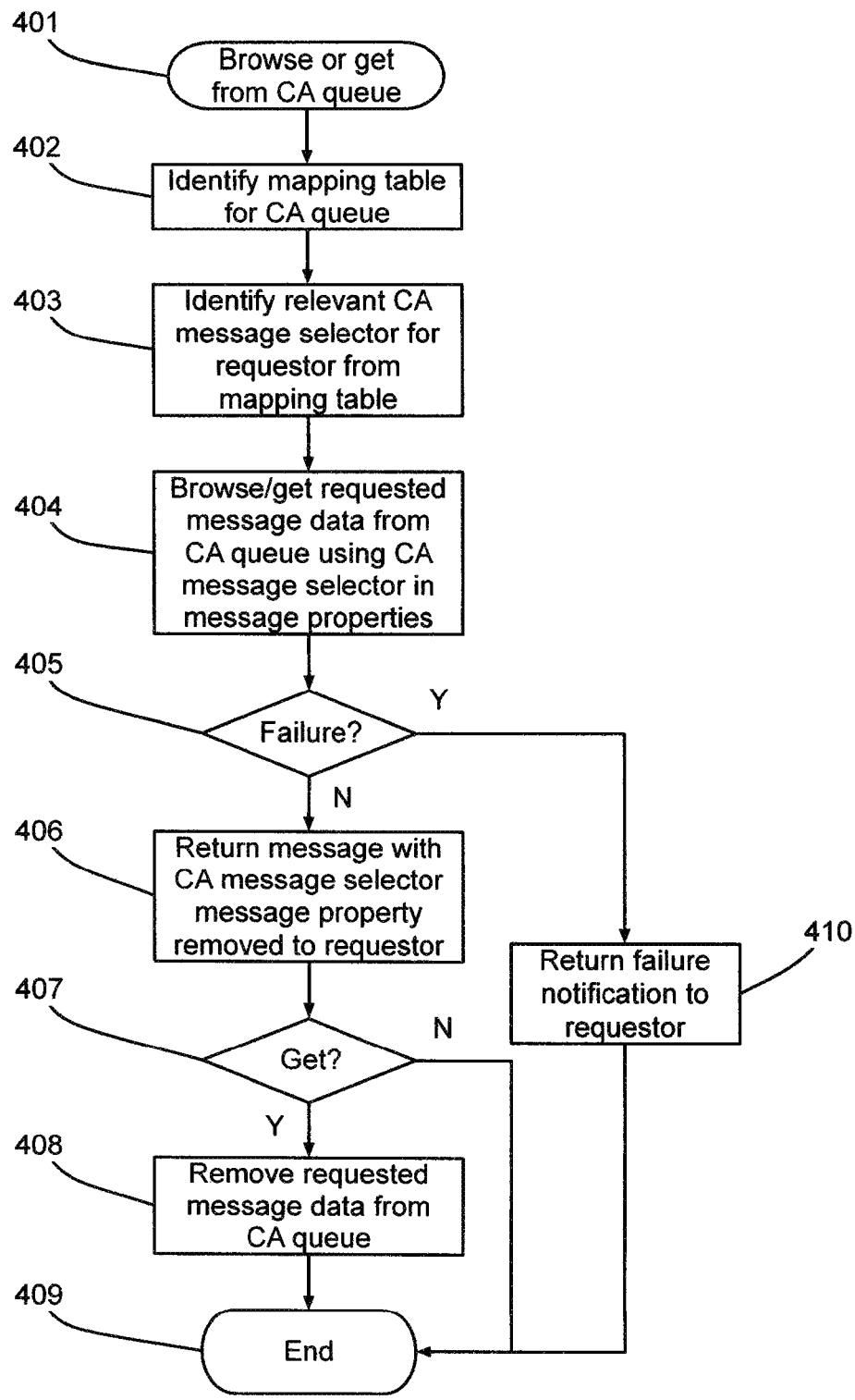
FIG. 4 is a flow chart illustrating the processing performed by the queue manager application program of FIG. 2 when browsing or getting a message from a controlled access queue.

The processing performed by the QAC 201 when browsing or getting a message on a CAQ 202 will now be described further with reference to the flow chart of FIG. 4. At step 401, processing is initiated in response to the receipt of a request to browse or get a message from a CAQ 202 and processing moves to step 402. At step 402, the mapping table 203 is identified for the CAQ 202 and processing moves to step 403. At step 403, the relevant set of message selectors 205 for the requestor is identified from the mapping table 203 and processing moves to step 404. At step 404, the relevant message 207 is identified on the relevant CAQ 203 using the set of message selectors 205 to filter messages according to their respective message properties 206 and processing moves to step 405. At step 405, if the message get or browse was successful then processing moves to step 406. At step 406, the set of access control message properties 206 is stripped from the retrieved message 207, which is then returned to the message requestor and processing moves to step 407. At step 407, if the original message request was a request to get a message then processing moves to step 408. At step 408, the requested message 207 is removed from the CAQ 202 and processing moves to step 409 and ends. If at step 405, the request failed then processing moves to step 410 where a failure notification is returned to the requestor and processing then moves to step 409 and ends. If at step 407 the request was to browse a message then processing moves straight to step 409 and ends leaving the relevant message on the CAQ 202.

In another embodiment, the QAC is arranged to receive access requests, modify the request and then return the modified request to the queue manager for processing. In other words, the QAC has no direct access to a CAQ. For example, if the queue manager receives a get request for a given CAQ, the request is passed to the QAC which is arranged to add the relevant message selector to the request before passing it back to the queue manager for processing. In this way, the normal request processing is minimally disturbed while the access control data in the mapping table is maintained independently of the queue manager module.

In another embodiment, a predetermined access control level is automatically assigned to a given requestor depending on an attribute of the requestor. For example, the access control level may be determined by the type or group of application program, the originating IP address or the locality of the request. This mechanism enables the administrator to be freed from the task of assigning access control levels on request.

In a further embodiment, access control levels are assigned for types requests. In other words, for a given requestor, one access control level may be assigned for browsing messages on the controlled access queue and another access control level may be defined for getting messages from the queue. For example, an application program may be unrestricted in the messages that can be read from the queue and highly restricted on the messages it can get from the queue.

As will be understood by those skilled in the art, embodiments of the invention enable the partitioning of a message queue, with access to some or all partitions controlled in dependence on a predetermined access assigned to a given requestor by an administrator.

In another embodiment, the controlled access queue is provided using an alias queue mechanism, extended to allow selection criteria, in the form of the controlled access message selectors, to be administratively defined. Since security is commonly applied to alias queues, this allows administrators to restrict an application to accessing a subset of messages on a real queue or topic, by denying access to the real message source and allowing access to the alias queue. In order to provide such a mechanism with an alias queue, the internal representations of alias queues are provided with one or more new selector attributes in the form of the controlled access message selectors. Also, the alias queue definition mechanism is augmented to allow such a selector to be specified when defining the alias queue and the alias queue display mechanisms are augmented to allow the selector to be reported. Open processing of the alias queue is also modified to logically AND the alias-defined selector with any application-provided selector as follows: (alias-selector) AND (application selector).

As will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for providing controlled access for a destination in a messaging system, said method comprising:
   determining one or more messages stored in the destination, wherein each message comprises one or more message properties;
   receiving an access request for accessing the destination wherein the access request comprises a requestor identifier;
   identifying a mapping table associated with the destination, wherein the mapping table comprises a set of requestor identifiers, each requestor identifier associated with a set of message selectors;
   obtaining from the mapping table a given set of message selectors associated with the requestor identifier comprised in the access request;
   comparing the message properties of each message stored in the destination with the given set of message selectors;
   returning, as a response to said access request, any messages stored in the destination comprising the message properties matching the given set of message selectors; and
   blocking access to any messages stored in the destination comprising message properties that fail to match the given set of message selectors.

2. The method according to claim 1 further comprising: removing said returned messages from said destination.

3. The method according to claim 1 wherein the set of message selectors is determined by an administrator for each requestor identifier in the mapping table.

4. The method according to claim 1 wherein said destination is a queue.

5. The method according to claim 1 wherein said destination is provided by an alias queue.

6. A computer program product comprising a non-transitory computer useable medium having a computer readable program, wherein the computer readable program when executed on a computer causes the computer to:
   determine one or more messages stored in the destination, wherein each message comprises one or more message properties;
   receive an access request for accessing the destination, wherein the access request comprises a requestor identifier;
   identify a mapping table associated with the destination, wherein the mapping table comprises a set of requestor identifiers, each requestor identifier associated with a set of message selectors;
   obtain from the mapping table a given set of message selectors associated with the requestor identifier comprised in the access request;
   compare the message properties of each message stored in the destination with the given set of message selectors;
   return, as a response to said access request, any messages stored in the destination comprising the message properties matching the given set of message selectors; and
   block access to any messages stored in the destination comprising message properties that fail to match the given set of message selectors.

7. The computer program product according to claim 6 wherein the computer readable program when executed on the computer further causes the computer to:
   remove said returned messages from said destination.

8. The computer program product according to claim 6 wherein the set of message selectors is determined by an administrator for each requestor identifier in the mapping table.

9. The computer program product according to claim 6 wherein said destination is a queue.

10. The computer program product according to claim 6 wherein said destination is provided by an alias queue.

* * * * *